(12) United States Patent
Fukushima

(10) Patent No.: US 10,999,469 B2
(45) Date of Patent: May 4, 2021

(54) TRANSMISSION APPARATUS AND CONTROL METHOD

(71) Applicant: CANON KABUSHIKI KAISHA, Tokyo (JP)

(72) Inventor: Kenta Fukushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/681,684

(22) Filed: Nov. 12, 2019

(65) Prior Publication Data
US 2020/0162632 A1 May 21, 2020

(30) Foreign Application Priority Data

Nov. 20, 2018 (JP) .............................. JP2018-217458
Nov. 28, 2018 (JP) .............................. JP2018-222415

(51) Int. Cl.
*H04N 1/32* (2006.01)
*H04N 1/327* (2006.01)

(52) U.S. Cl.
CPC ..... *H04N 1/32641* (2013.01); *H04N 1/32765* (2013.01); *H04N 1/32786* (2013.01)

(58) Field of Classification Search
CPC ........... H04N 1/32641; H04N 1/32786; H04N 1/32765
See application file for complete search history.

(56) References Cited

U.S. PATENT DOCUMENTS

| | | | | |
|---|---|---|---|---|
| 8,291,262 B2* | 10/2012 | Tsujimoto | .......... | H04N 1/32619 714/18 |
| 9,699,330 B2* | 7/2017 | Odaira | ............... | H04N 1/32096 |
| 2011/0004789 A1* | 1/2011 | Tsujimoto | .......... | H04N 1/00214 714/18 |
| 2013/0124737 A1* | 5/2013 | Tachibana | ................ | H04N 1/00 709/227 |
| 2013/0229694 A1* | 9/2013 | Tonegawa | .......... | H04N 1/00217 358/426.01 |
| 2015/0049161 A1* | 2/2015 | Fukushima | ........ | H04N 1/00344 348/14.04 |
| 2015/0281511 A1* | 10/2015 | Furutani | ............ | H04N 1/32651 358/1.14 |

(Continued)

FOREIGN PATENT DOCUMENTS

JP 2011-015131 A 1/2011

*Primary Examiner* — Ted W Barnes
(74) *Attorney, Agent, or Firm* — Canon U.S.A., Inc. I.P. Division

(57) ABSTRACT

A transmission apparatus includes a scanner. A first control is performed about reading of a plurality of pages of documents by using the scanner to generate image data. A second control is performed about conversion processing of the generated image data. A third control is performed about transmission of processed data on which the conversion processing is performed. The third control includes starting a session while a document is being read based on the first control, and transmitting, to an external apparatus via a network, the processed data on which conversion is already performed. Where an error occurs in the scanner in reading the documents, the third control further includes disconnecting the started session. Where the error is resolved, the third control further includes connecting the session again and transmitting, to the external apparatus via the network, processed data on which the conversion processing is performed.

7 Claims, 13 Drawing Sheets

(56) References Cited

U.S. PATENT DOCUMENTS

| | | | |
|---|---|---|---|
| 2015/0370519 A1* | 12/2015 | Tachi | G06F 3/1207 |
| | | | 358/1.15 |
| 2017/0134504 A1* | 5/2017 | Takahashi | H04L 67/04 |
| 2017/0223199 A1* | 8/2017 | Maeda | G06F 3/1288 |
| 2017/0223221 A1* | 8/2017 | Maeda | G06F 3/1267 |

* cited by examiner

FIG.4A
Transmission job management table

| Transmission job ID | Scan setting | Scan state | File type | File division setting | Unconverted document ID | Converted document ID list | File conversion state | Destination setting | Transmission state | Job stop flag |
|---|---|---|---|---|---|---|---|---|---|---|
| 0001 | Resolution: 300 × 300 Mode: Text photo | Completed | High compression PDF | Divide in units of three pages | 0010 | 0011, 0012, 0013 | Completed | FTP: 192.168.50.11 | In process | False |
| 0002 | Resolution: 600 × 600 Mode: Text | In process | PDF | Not divide | 0020 | 0021 | In process | FTP: ftp.server.co.jp | In process | False |

FIG.4B
Document management table

| Document ID | Document completion flag | Header data | First page data | ... | Nth page data | Footer data |
|---|---|---|---|---|---|---|
| 0010 | True | ◐ | ▱ |  |  |  |
| 0011 | True | ◐ | ▱ |  | ▱ | ◐ |
| 0012 | True | ◐ | ▱ |  | ▱ | ◐ |
| 0013 | True | ◐ | ▱ |  | ▱ | ◐ |
| 0020 | False | ◐ | ▱ |  | ▱ | ◐ |
| 0021 | False | ◐ | ▱ |  |  |  |

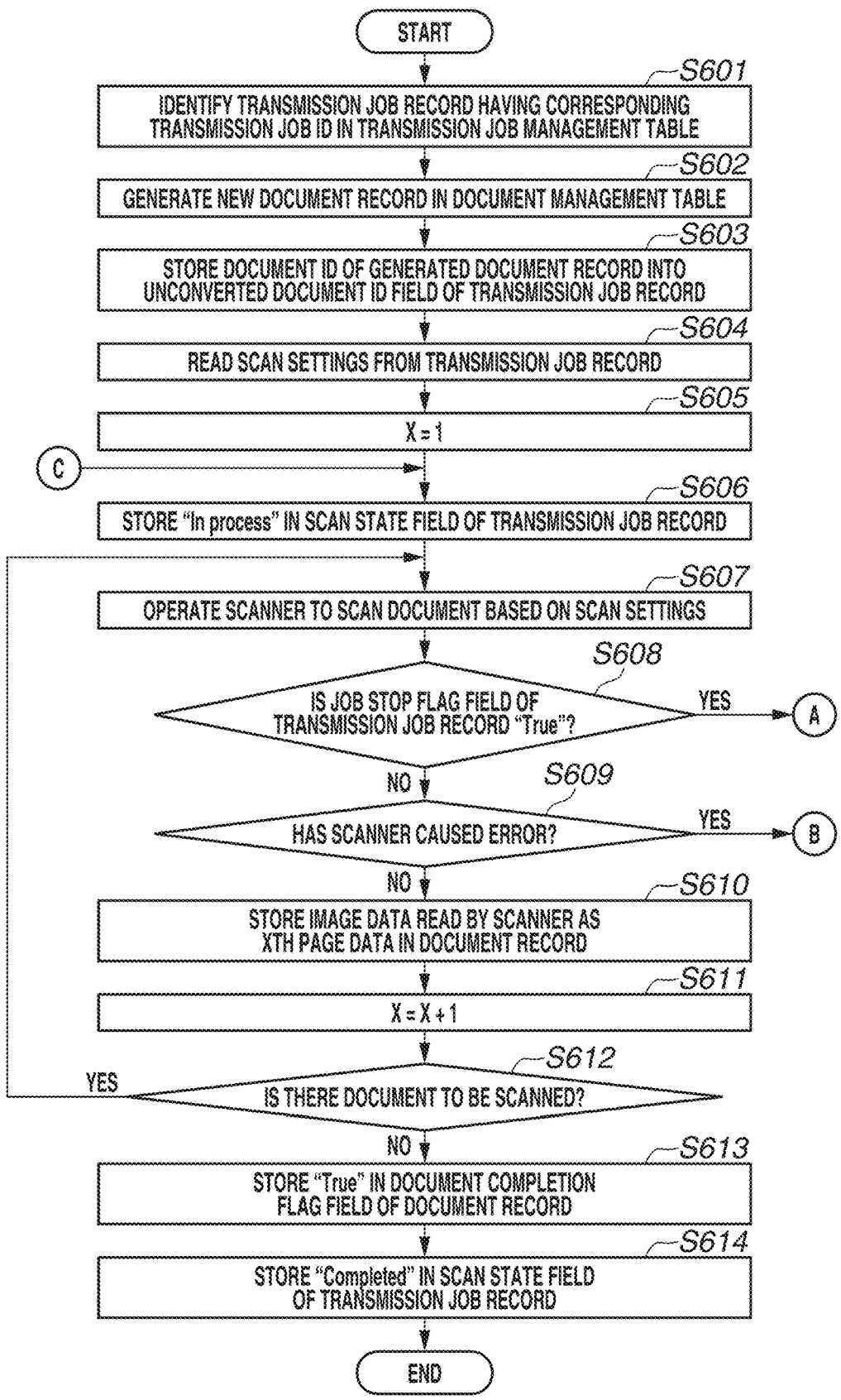

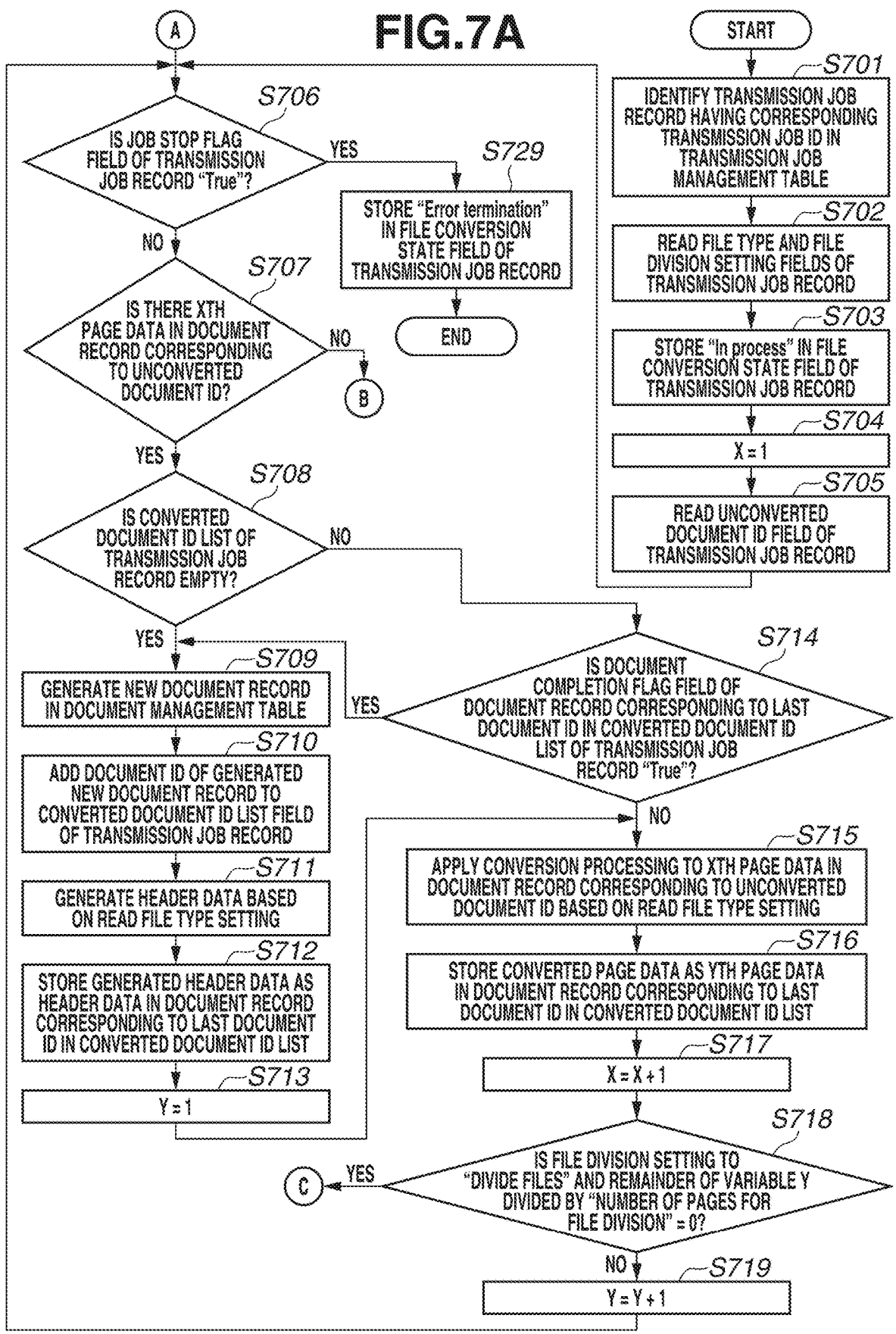

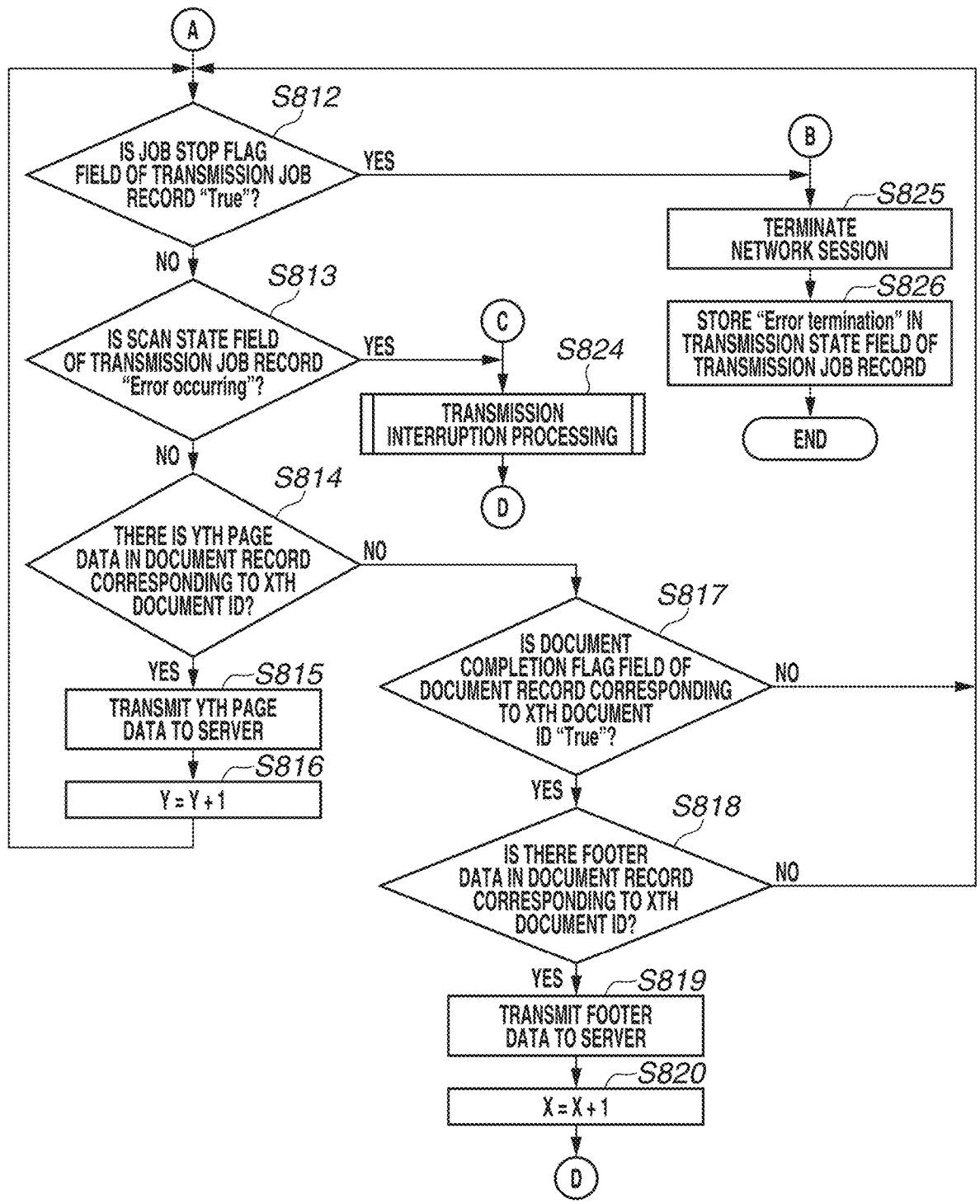

TRANSMISSION APPARATUS AND CONTROL METHOD

BACKGROUND

Field

The present disclosure relates to a technique for converting an image read by a scanner into a file in a specified image format and transmitting the file to a transmission destination on a network.

Description of the Related Art

There are image processing apparatuses such as a multifunction peripheral (MFP) that converts an image read by a scanner into a file in a specified image format and transmits the file to a transmission destination on a network. Since MFPs are used by a plurality of users, MFPs are desired to read documents at high speed and quickly become available to the next user before the data transmission ends. MFPs have therefore been designed mainly for increased scan speed, without much consideration of the transmission speed.

In a recent workflow, after the transmission of image files by MFPs, more and more operators are checking the contents of the files. There has thus been a growing demand to transmit files to transmission destinations as quickly as possible.

Attempts have been made to configure an MFP to perform transmission processing in parallel with a document scan to expedite the completion of transmission. There is also a discussion about performing transmission with less time loss even in a case where an MFP is thus performing a scan and transmission processing in parallel and a scanner error such as a jam occurs during scanning (Japanese Patent Application Laid-Open No. 2011-15131).

According to the conventional technique, however, a communication session with a server that is the transmission destination is left connected while the scanner error persists. In other words, network resources of the server are occupied even while the user is resolving the error. There has thus been an issue of increased load on the server.

SUMMARY

According to an aspect of the present disclosure, a transmission apparatus includes a scanner, one or more processors, and memory storing instructions that, when executed by the one or more processors, cause the transmission apparatus to perform operations including: performing a first control about reading of a plurality of pages of documents by using the scanner to generate image data, performing a second control about conversion processing of the generated image data, and performing a third control about transmission, to an external apparatus via a network, of processed data on which the conversion processing is performed, wherein the third control includes starting a session while a document is being read based on the first control, and transmitting, to the external apparatus via the network, the processed data on which conversion is already performed, wherein, in a case where an error occurs in the scanner in reading the documents, the third control further includes disconnecting the started session, and wherein, in a case where the error is resolved, the third control further includes connecting the session again and transmitting, to the external apparatus via the network, processed data on which the conversion processing is performed.

Further features of the present disclosure will become apparent from the following description of exemplary embodiments with reference to the attached drawings.

BRIEF DESCRIPTION OF THE DRAWINGS

FIGS. 4A and 4B are diagrams illustrating an example of a transmission job management table and a document management table.

FIGS. 6A and 6B are a flowchart illustrating an example of processing of a scan module.

FIGS. 7A and 7B are a flowchart illustrating an example of processing of a file conversion module.

FIGS. 8A and 8B are a flowchart illustrating an example of overall processing of a transmission module.

DESCRIPTION OF THE EMBODIMENTS

Figure 1:
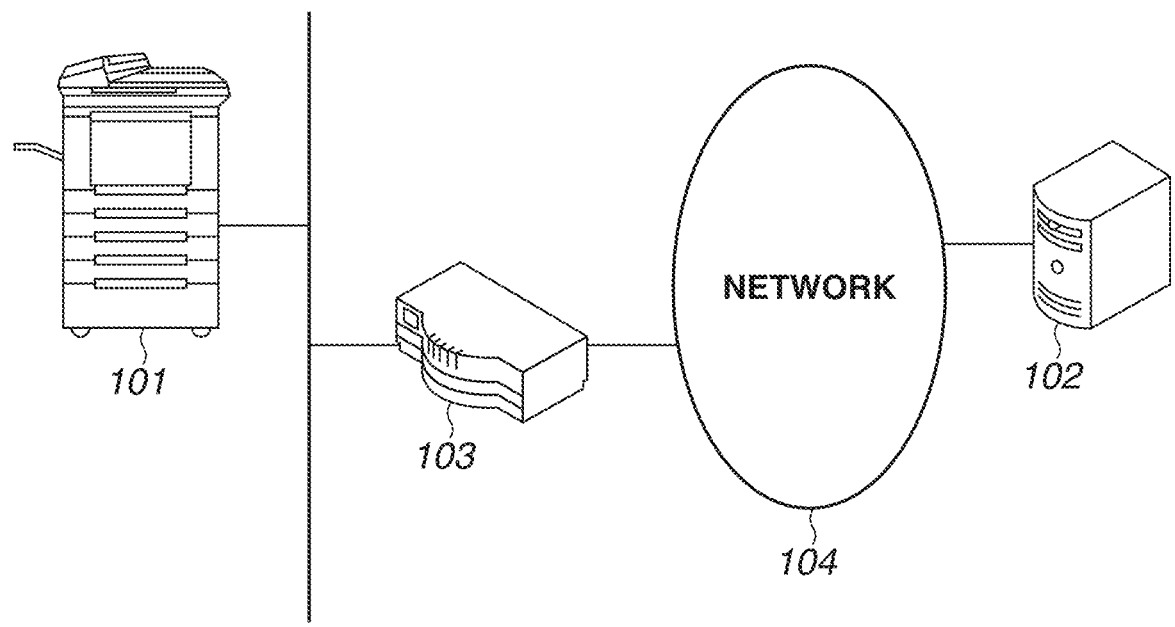
FIG. 1 is a configuration diagram of an image processing system according to an exemplary embodiment.

Exemplary embodiments of the present disclosure will be described below with reference to the drawings. FIG. 1 is a diagram for describing an example of a configuration of an image processing system including an image processing apparatus according to an exemplary embodiment of a transmission apparatus of the present disclosure. In an example, a transmission module starts a session while a document is being read based on a scan control, and transmits data on which conversion processing is performed to a server. If an error occurs in a scanner, the started session is disconnected. If the error is resolved, the session is connected again to resume data transmission to the server.

As illustrated in FIG. 1, in the image processing system according to the present exemplary embodiment, a multifunction peripheral (MFP) 101 serving as an image processing apparatus can communicate with a server 102 via a firewall (FW) 103 and a network 104. In the present exemplary embodiment, the MFP 101 includes a communication function for communicating with the server 102 by using the File Transfer Protocol (FTP), for example. However, the communication protocol is not limited to the FTP.

The MFP 101 is connected to the network 104 through the FW 103. In the present exemplary embodiment, the server 102 operates as an FTP server, and the MFP 101 as an FTP client. The server 102 functions as an image filing server that stores image files transmitted from the MFP 101.

In the present exemplary embodiment, the MFP 101 is configured to communicate with the network 104 via the FW 103. However, the network configuration may be without the FW 103. The network 104 may be connected with more FWs 103, MFPs 101, and servers 102 than illustrated. In the present exemplary embodiment, the communication protocol is not limited to the FTP, and the Server Message Block (SMB) and web-based Distributed Authoring and Versioning (WebDAV) may be used. The communication protocol may be a mail communication protocol such as the Simple Mail Transfer Protocol (SMTP).

Figure 2:
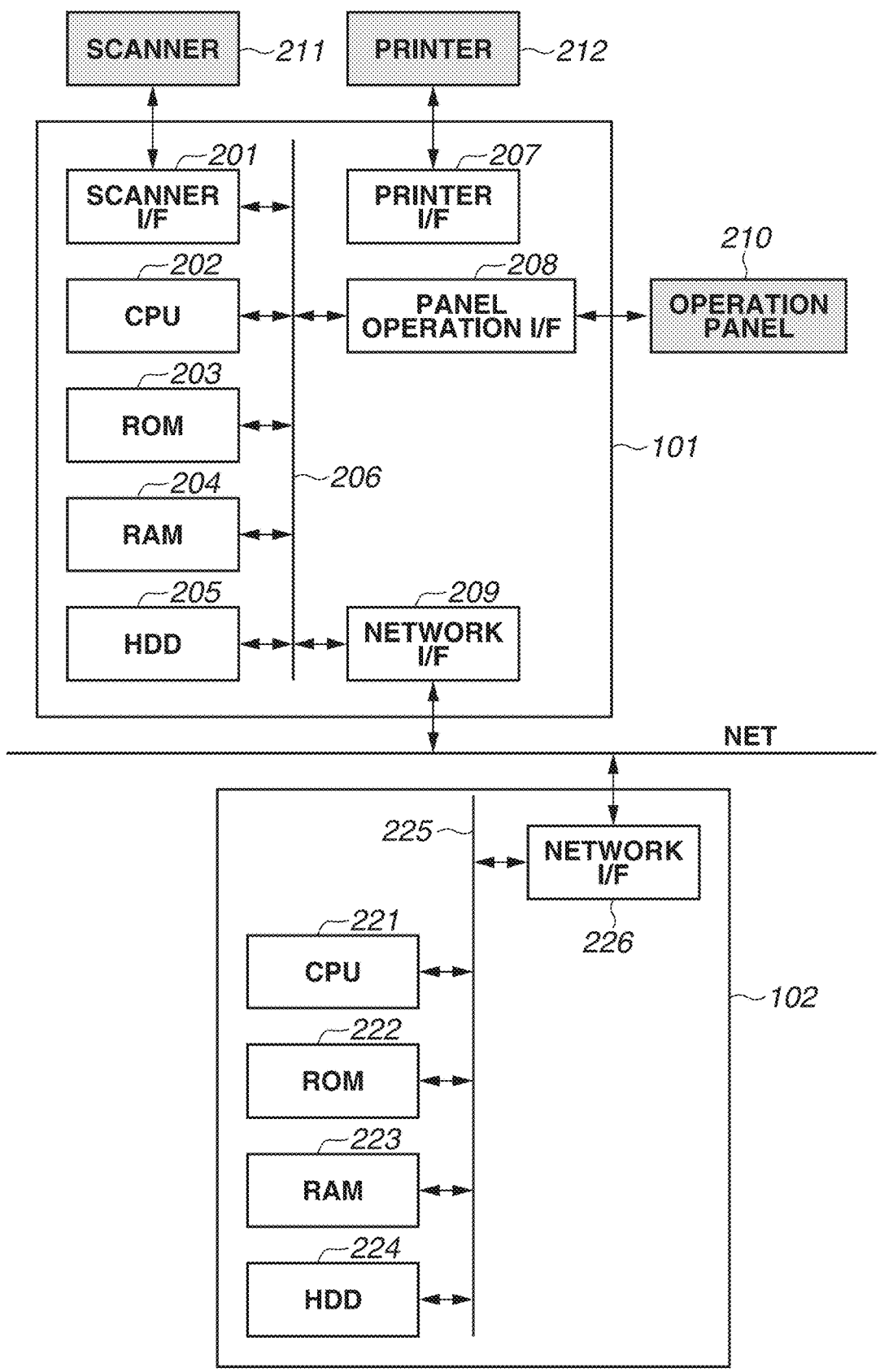
FIG. 2 is a hardware configuration diagram of the entire image processing system according to the present exemplary embodiment.

FIG. 2 is a block diagram illustrating an example of a hardware configuration of the entire image processing system according to the present exemplary embodiment.

In the MFP 101, a central processing unit (CPU) 202 controls access to/from various devices connected to a system bus 206 in a comprehensive manner based on a control program stored in a read-only memory (ROM) 203 or a hard disk (hard disk drive (HDD)) 205. The ROM 203 stores control programs executable by the CPU 202. A random access memory (RAM) 204 functions mainly as a main memory and a work area of the CPU 202, and is configured so that its memory capacity can be extended by an optional RAM connected to a not-illustrated extension port.

The HDD 205 stores a boot program, various applications, font data, user files, and edited files. While the present exemplary embodiment uses the HDD 205, a solid state drive (SSD) may be used instead of or in addition to the HDD 205. A Secure Digital (SD) card or a flash memory may be used as an external storage device aside from the HDD 205.

A scanner interface (I/F) 201 controls image input from a scanner 211. A printer I/F 207 controls image output to a printer 212. A panel operation I/F 208 performs a display control on an operation panel 210, and controls input of various types of setting information set from the operation panel 210. A network I/F 209 performs data communication with an external network via a network cable.

The scanner 211 feeds a plurality of documents placed on a document tray in succession to read images on the documents, and outputs the read image data page by page in order. The printer 212 prints an image based on image data on a recording medium. The operation panel 210 includes a liquid crystal display (LCD) display panel that comes with a touch panel, and hardware keys such as a start key and a numerical keypad. The operation panel 210 can display software buttons on the LCD display panel and detect a user's touch on the buttons with a finger, thereby allowing for smooth user operation.

In the server 102, a CPU 221 controls access to/from various devices connected to a system bus 255 in a comprehensive manner based on a control program stored in a ROM 222 or an HDD 224. The ROM 222 stores control programs executable by the CPU 221. The RAM 223 functions mainly as a main memory and a work area of the CPU 221, and is configured so that its memory capacity can be extended by an optional RAM connected to a not-illustrated extension port.

The HDD 224 stores a boot program, various applications, font data, user files, and edited files. While the present exemplary embodiment uses the HDD 224, an SSD may be used instead of or in addition to the HDD 224. An SD card or a flash memory may be used as an external storage device aside from the HDD 224.

A network I/F 226 performs data communication with an external network via a network cable.

Figure 3:
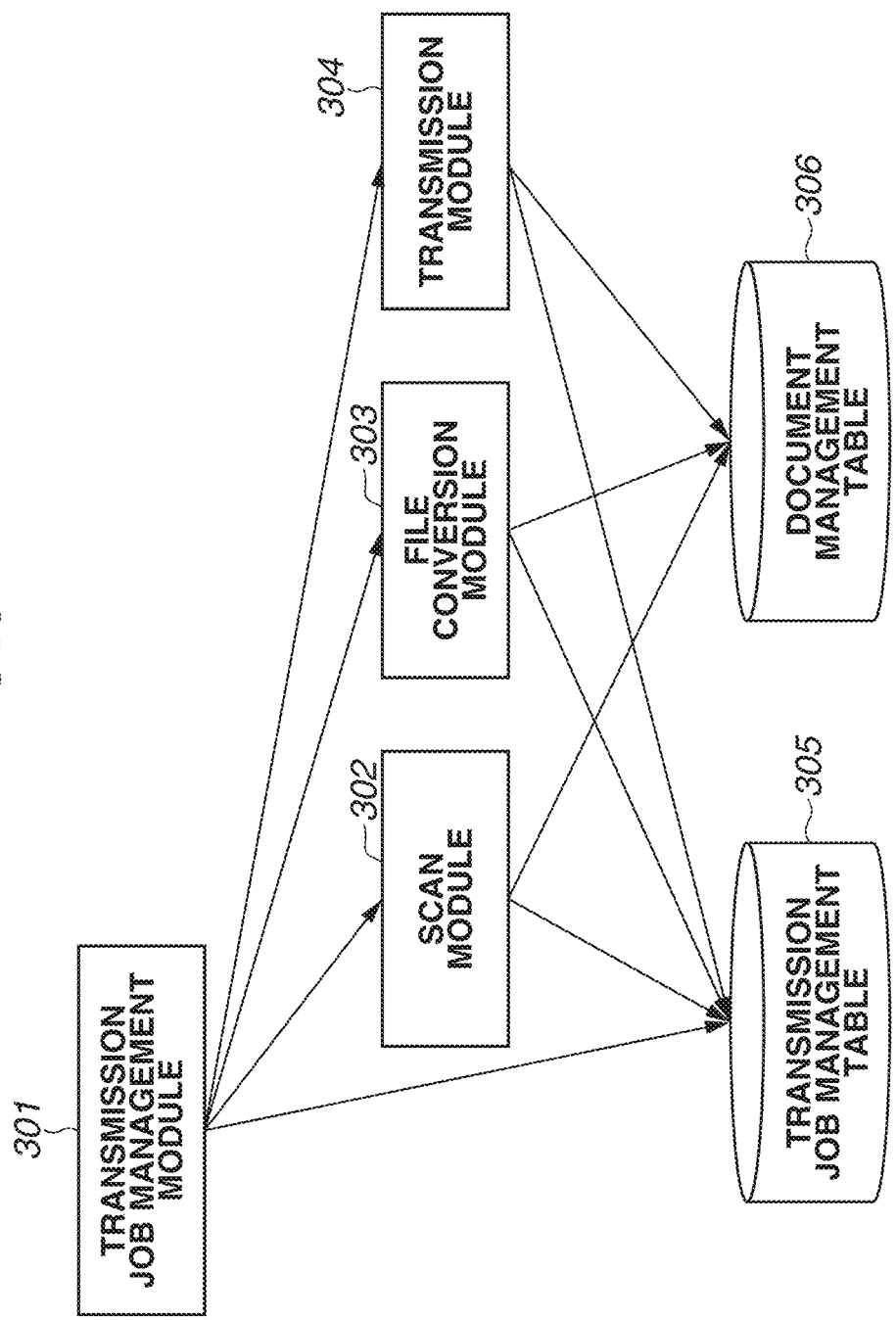
FIG. 3 is a software configuration diagram of an image processing apparatus.

FIG. 3 is a block diagram illustrating an example of a software configuration of the MFP 101.

As illustrated in FIG. 3, the MFP 101 includes a transmission job management module 301, a scan module 302, a file conversion module 303, and a transmission module 304 as software modules. The modules 301 to 304 are software modules implemented by the CPU 202 of the MFP 101 executing programs stored in the ROM 203 or the HDD 205.

The HDD 205 of the MFP 101 stores a transmission job management table 305 and a document management table 306. The software modules 301 to 304 use data in the tables 305 and 306 during operation.

In the present exemplary embodiment, the MFP 101 scans documents to read images, and transmits, to the server 102, image files in a specified image format into which the images are converted. The roles of the respective modules 301 to 304 of the MFP 101 during operation within the entire operation will be described.

The transmission job management module 301 is a module that manages entire processing including a scan, file conversion, and transmission. The transmission job management module 301 generates a transmission job when triggered by a user operation.

The scan module 302 controls the scanner 211 via the scanner I/F 201 and generates image data. The scan module 302 is activated by the transmission job management module 301. The scanner 211 includes a not-illustrated feeder (automatic document feeding device). The scanner 211 feeds a plurality of documents placed on the document tray in succession to read images on the documents, and outputs the read image data page by page in order. The scan module 302 controls the reading of a plurality of pages of documents by using the scanner 211 to generate image data.

The file conversion module 303 is a module that converts the image data generated by the scan module 302 into a predetermined file format to generate a document file or files. The file conversion module 303 is also activated by the transmission job management module 301.

The transmission module 304 is a module that transmits the document file(s) generated by the file conversion module 303 to the server 102. The transmission module 304 is also activated by the transmission job management module 301.

The transmission job management table 305 stores parameters for the modules 301 to 304 to operate with in the form of transmission job records.

FIG. 4A is a diagram illustrating an example of the transmission job management table 305.

The transmission job management table 305 includes fields such as a transmission job identifier (ID), a scan setting, a scan state, a file type, a file division setting, an unconverted document ID, a converted document ID list, a file conversion state, a destination setting, a transmission state, and a job stop flag.

The document management table 306 is a table storing image data scanned by the scan module 302 and document files converted by the file conversion module 303.

FIG. 4B is a diagram illustrating an example of the document management table 306.

The document management table 306 includes fields such as a document ID, a document completion flag, header data, first page data, . . . , Nth page data, and footer data.

The scan module 302, the file conversion module 303, and the transmission module 304 can perform processing in parallel. Take, for example, the case of scanning and transmitting two documents. The MFP 101 can convert image data on the first document into a document file and transmit the document file to the server 102 while the scanner 211 is scanning the second document.

The processing of the modules will be described in detail below with reference to flowcharts.

Figure 5:
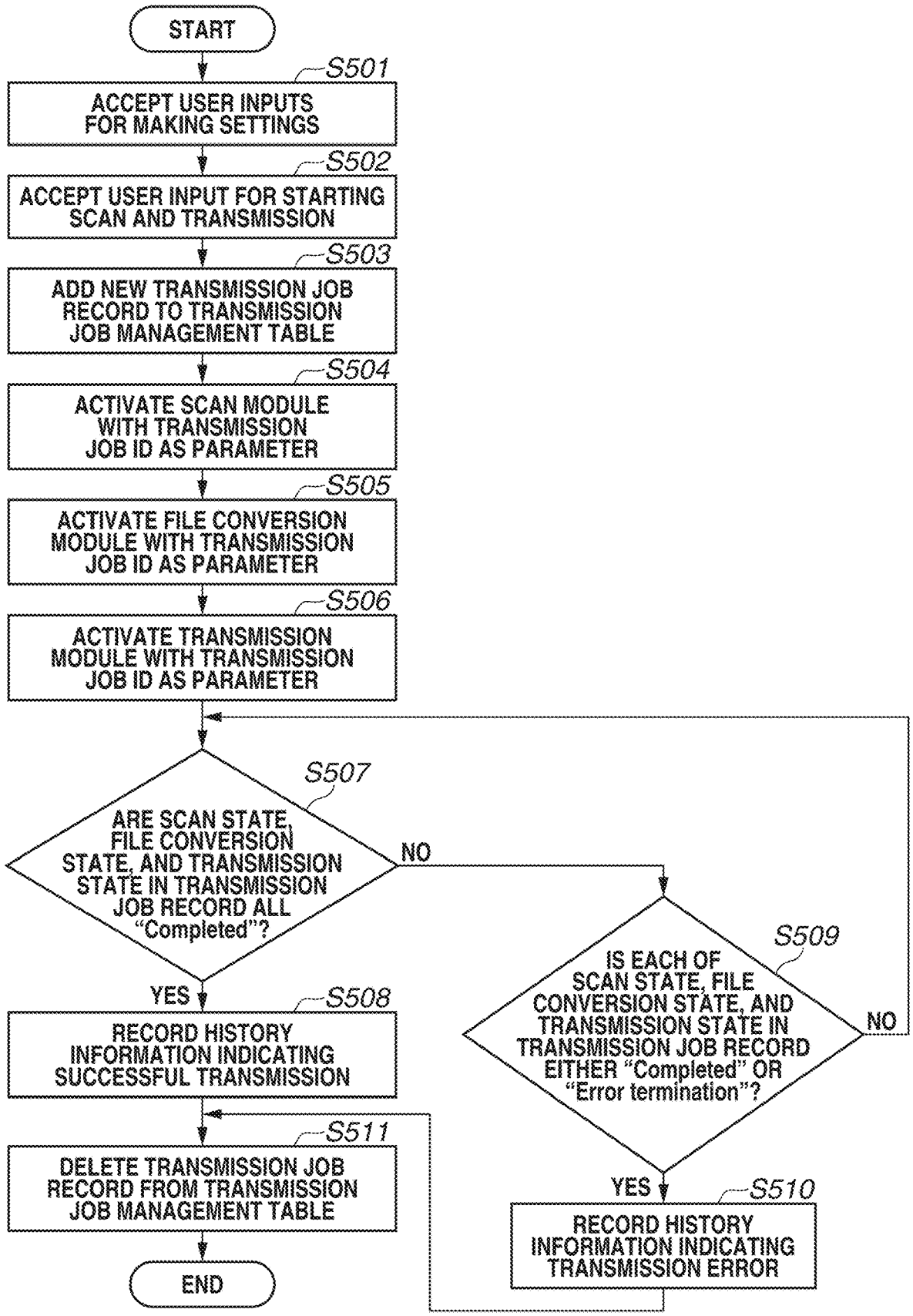
FIG. 5 is a flowchart illustrating an example of processing of a transmission job management module.

FIG. 5 is a flowchart illustrating an example of the processing of the transmission job management module 301. The processing of the present flowchart is implemented by the CPU 202 reading a program stored in the HDD 205 into the RAM 204 and executing the program.

The processing of the present flowchart is started when the operation panel 210 of the MFP 101 is operated by the user. When the processing is started, in step S501, the transmission job management module 301 accepts user inputs for making settings about a scan and transmission from the operation panel 210. The settings include scan settings such as resolution and document type settings, file settings such as file format and file division settings, and transmission settings such as a destination setting.

In step S502, the transmission job management module 301 accepts a user input for starting the scan and transmission from the operation panel 210.

In step S503, upon accepting the user input for starting the scan and transmission, the transmission job management module 301 adds a new transmission job record to the transmission job management table 305 on the HDD 205. Here, the transmission job management module 301 stores the settings input in step S501 into the new transmission job record. The transmission job management module 301 also issues a unique transmission job ID in the transmission job management table 305, and stores the transmission job ID in the new transmission job record.

In step S504, after the transmission job record is added, the transmission job management module 301 activates the scan module 302 with the transmission job ID issued in step S503 as a parameter. The operation of the activated scan module 302 will be described in detail with reference to FIGS. 6A and 6B.

In step S505, the transmission job management module 301 activates the file conversion module 303 with the transmission job ID issued in step S503 as a parameter. The operation of the activated file conversion module 303 will be described in detail with reference to FIGS. 7A and 7B.

In step S506, the transmission job management module 301 activates the transmission module 304 with the transmission job ID issued in step S503 as a parameter. The operation of the activated transmission module 304 will be described in detail with reference to FIGS. 8A, 8B, and 9.

After the activation of the modules 302 to 304 in the foregoing steps S504 to S506, the transmission job management module 301 delegates processing to the modules 302 to 304, and waits for the modules 302 to 304 to complete processing. In step S507, the transmission job management module 301 determines whether the scan state, the file conversion state, and the transmission state in the added transmission job record of the transmission job management table 305 are all "Completed".

If the scan state, the file conversion state, and the transmission state are all "Completed" (YES in step S507), the processing proceeds to step S508. In step S508, the transmission job management module 301 records history information indicating a successful transmission in the HDD 205.

On the other hand, if at least any one of the scan state, the file conversion state, and the transmission state is not "Completed" (NO in step S507), the processing proceeds to step S509.

In step S509, the transmission job management module 301 determines whether each of the scan state, the file conversion state, and the transmission state in the added transmission job record of the transmission job management table 305 is either "Completed" or "Error termination".

If at least any one of the scan state, the file conversion state, and the transmission state is neither "Completed" nor "Error termination" (NO in step S509), the processing returns to step S507. In such a manner, the transmission job management module 301 waits for the modules 302 to 304 to finish processing.

On the other hand, if each of the scan state, the file conversion state, and the transmission state is either "Completed" or "Error termination" (YES in step S509), the processing proceeds to step S510. In step S510, the transmission job management module 301 records history information indicating a transmission error in the HDD 205.

The determination in step S507 is YES only if all the states are "Completed". The determination in step S509 is YES if the states are a combination of "Error termination" and "Completed". In other words, the transmission job management module 301 makes a determination of "normal termination" in step S507, and a determination of "abnormal termination" in step S509.

After the history information is stored in the HDD 205 in the foregoing step S508 or S510, the processing proceeds to step S511. In step S511, the transmission job management module 301 deletes the transmission job record added in step S503 from the transmission job management table 305. The processing of the present flowchart ends. In step S511, the transmission job management module 301 also deletes all document records corresponding to the unconverted document ID and the document IDs listed in the converted document ID list of the transmission job record from the document management table 306 at the same time.

Figure 6B:
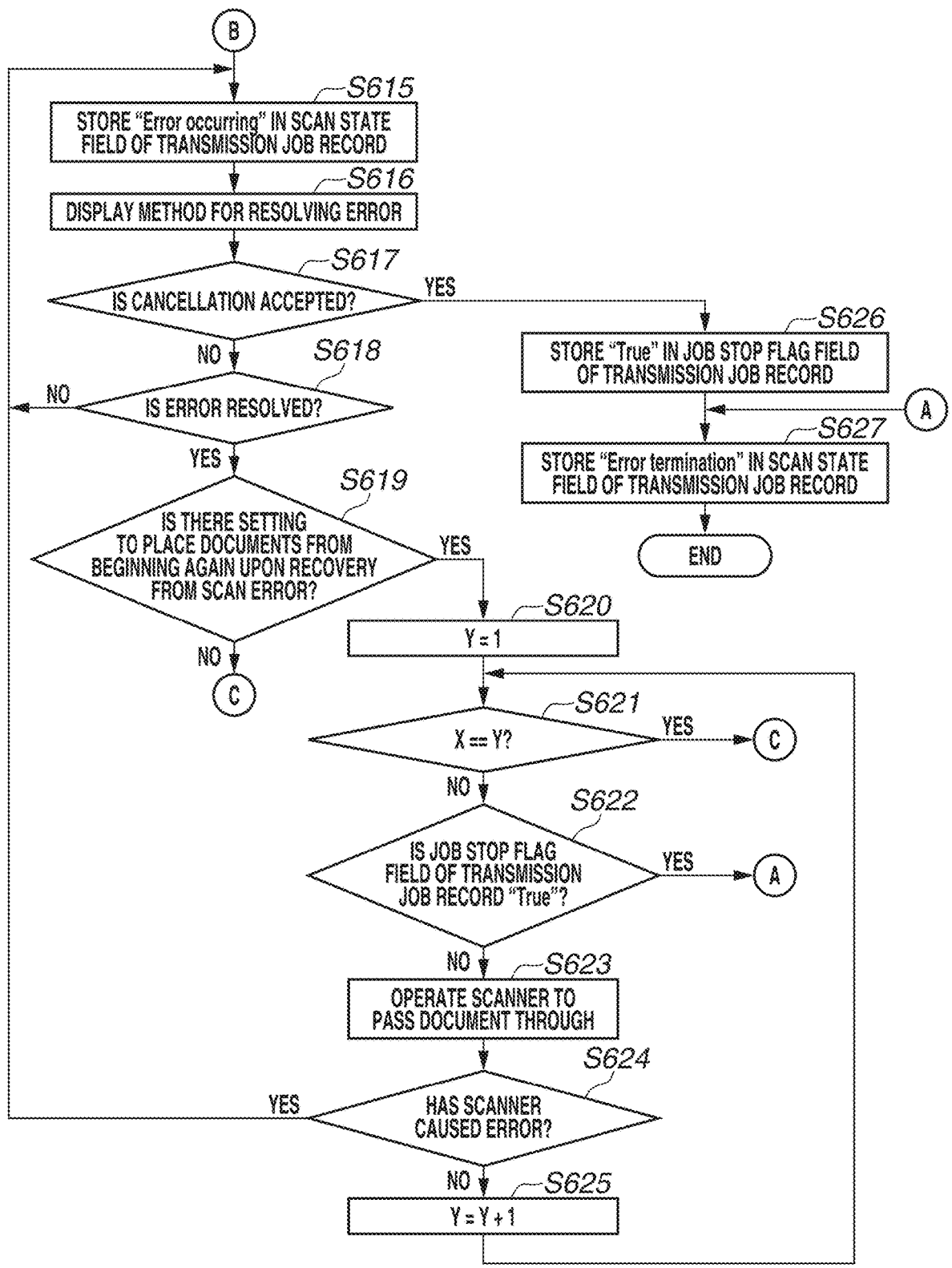

FIGS. 6A and 6B are a flowchart illustrating an example of the processing of the scan module 302. The processing of the present flowchart is implemented by the CPU 202 reading a program stored in the HDD 205 into the RAM 204 and executing the program.

The processing of the flowchart is started when the scan module 302 is activated by the transmission job management module 301 in the processing of step S504 in FIG. 5. When the processing is started, in step S601, the scan module 302 initially receives the transmission job ID passed from the transmission job management module 301 upon activation, and identifies the transmission job record having the corresponding transmission job ID in the transmission job management table 305. By such processing, the scan module 302 can identify the transmission job record to be processed.

In step S602, the scan module 302 generates a new document record in the document management table 306 on the HDD 205. Here, the scan module 302 issues a unique document ID in the document management table 306, and stores the document ID in the new document record.

In step S603, the scan module 302 stores the document ID of the new document record generated in step S602 (hereinafter, referred to as "document record") into the unconverted document ID field of the transmission job record identified in step S602 (hereinafter, referred to as "transmission job record").

In step S604, the scan module 302 reads the value of the scan setting field (scan settings) from the transmission job record.

In step S605, the scan module 302 sets "1" to a variable X indicating the count of the number of read documents. In step S606, the scan module 302 stores "In process" in the scan state field of the transmission job record.

The scan module 302 then operates the scanner 211.

In step S607, the scan module 302 initially operates the scanner 211 to scan a document based on the scan settings read in the foregoing step S604.

In step S608, the scan module 302 determines whether the job stop flag field of the transmission job record is "True".

The job stop flag is a field used to stop the operation of the scan module 302, the file conversion module 303, and the transmission module 304 in aborting the transmission job. The modules 302 to 304 frequently use the job stop flag to make a determination at necessary timing. For example, the job stop flag is set to "True" if cancellation is accepted in step S617 (FIG. 6B) to be described below. Although not illustrated in the drawings, the job stop flag is also set to "True" if an error occurs in the file conversion module 303 or the transmission module 304.

If the job stop flag field of the transmission job record is not "True" (NO in step S608), the processing proceeds to step S609.

In step S609, the scan module 302 determines whether the scanner 211 operated in the foregoing step S607 has caused an error. An example of the error caused by the scanner 211 is a jam (document jam). Other examples of the error include the number of pages read for the transmission function of the MFP 101 reaching an upper limit. The errors determined in step S609 refer to ones for which whether to continue the transmission job by resolving the error or once cancel the transmission job can be selected by a user operation. The user operation can be made from the operation panel 210.

If, in step S609, it is determined that the scanner 211 has not caused an error (NO in step S609), the processing proceeds to step S610.

In step S610, the scan module 302 stores image data read by the scanner 211 as Xth page data in the document record. In step S611, the scan module 302 increments the variable X. The processing proceeds to step S612.

In step S612, the scan module 302 determines whether there is a document to be scanned. Here, the scan module 302 makes a determination, for example, by detecting whether there still is any document on the feeder by using a sensor included in the scanner 211.

If there is a document to be scanned (YES in step S612), the processing returns to step S607. In step S607, the scan module 302 performs control to continue reading the next document.

On the other hand, if the scan module 302 determines that there is no document to be scanned (NO in step S612), the processing proceeds to step S613. In step S613, the scan module 302 stores "True" in the document completion flag field of the document record.

In step S614, the scan module 302 stores "Completed" in the scan state field of the transmission job record. The processing of the present flowchart ends.

If, in step S609, if it is determined that the scanner 211 has caused an error (YES in step S609), the processing proceeds to step S615 (FIG. 6B) to make a recovery from the error.

In step S615, the scan module 302 stores "Error occurring" in the scan state field of the transmission job record.

In step S616, the scan module 302 displays a method for resolving the occurred error on the operation panel 210, and displays a button for accepting job cancellation (cancel button).

In step S617, the scan module 302 determines whether cancellation is accepted (the cancel button displayed in step S616 is pressed). If it is determined that cancellation is not accepted (NO in step S617), the processing proceeds to step S618.

In step S618, the scan module 302 determines whether the error determined to have occurred in the foregoing step S609 is resolved by the user. If the error is determined to be not resolved yet (NO in step S618), the processing returns to step S615. In step S615, the scan module 302 performs control to wait again for the cancel button to be pressed or for the error to be resolved.

On the other hand, if the error is determined to be resolved (YES in step S618), the processing proceeds to step S619.

In step S619, the scan module 302 determines whether there is a setting to place documents from the beginning again upon recovery from a scan error. For example, such a setting is preset in the MFP 101 and stored in the HDD 205. The setting may be included in the settings input in step S501 of FIG. 5.

If there is no setting to place documents from the beginning again upon recovery from a scan error (NO in step S619), the processing returns to step S606 (FIG. 6A). In step S606, the scan module 302 performs control to resume scanning. Since the variable X still indicates the page number of the document at which the error has occurred, the scan module 302 then operates to resume scanning at the error-occurred page.

On the other hand, if there is a setting to place documents from the beginning again upon recovery from a scan error (YES in step S619), the processing proceeds to step S620.

In step S620, the scan module 302 sets "1" to a variable Y indicating the number of pages to be idly scanned.

In step S621, the scan module 302 determines whether the value of the variable Y coincides with that of the variable X remaining at the error-occurred page. The values of the variables Y and X coinciding means that the number of documents passed through the scanner 211 in step S623 to be described below has reached the number of documents immediately before the page at which the error is determined to have occurred in the foregoing step S609. The next page to be scanned is the page at which the error has occurred.

If the values of the variables Y and X do not coincide (NO in step S621), the processing proceeds to step S622.

In step S622, the scan module 302 determines whether the job stop flag field of the transmission job record is "True". If the job stop flag field of the transmission job record is not "True" (NO in step S622), the processing proceeds to step S623.

In step S623, the scan module 302 operates the scanner 211 to pass a document through. Since this processing is intended to fast-forward documents up to the error-occurred document, no image data is generated.

In step S624, the scan module 302 determines whether the scanner 211 has caused an error. In step S624, the scan module 302 performs the same error determination as that of step S609. If it is determined that the scanner 211 has not caused an error (NO in step S624), the processing proceeds to step S625.

In step S625, the scan module 302 increments the variable Y. The processing returns to step S621. In step S621, the scan module 302 proceeds to the fast forward processing of the next document.

In step S621, if the values of the variables Y and X are determined to coincide (YES in step S621), the processing returns to step S606 (FIG. 6A). In step S606, the scan module 302 performs control to resume scanning. The foregoing processing of steps S615 to S625 allows the scan processing to be continued from the point of error after the removal of the scan error, whether by placing the documents from the beginning again or without placing the documents from the beginning again.

If it is determined that the scanner 211 has caused an error during the foregoing fast forward processing (YES in step S624), the processing returns to step S615. In step S615, the scan module 302 waits for the error to be resolved again.

In step S617, if cancellation is determined to be accepted (YES in step S617), the processing proceeds to step S626.

In step S626, the scan module 302 stores "True" in the job stop flag field of the transmission job record.

In step S627, the scan module 302 stores "Error termination" in the scan state field of the transmission job record. The processing of the present flowchart ends. In such a case, the transmission job is aborted.

If, in the foregoing step S608 or S622, the job stop flag field of the transmission job record is "True" (YES in step S608 or S622), the processing proceeds to step S627. In step S627, the scan module 302 stores "Error termination" in the scan state field of the transmission job record. The processing of the present flowchart ends. In such a case, the transmission job is aborted.

Figure 7B:
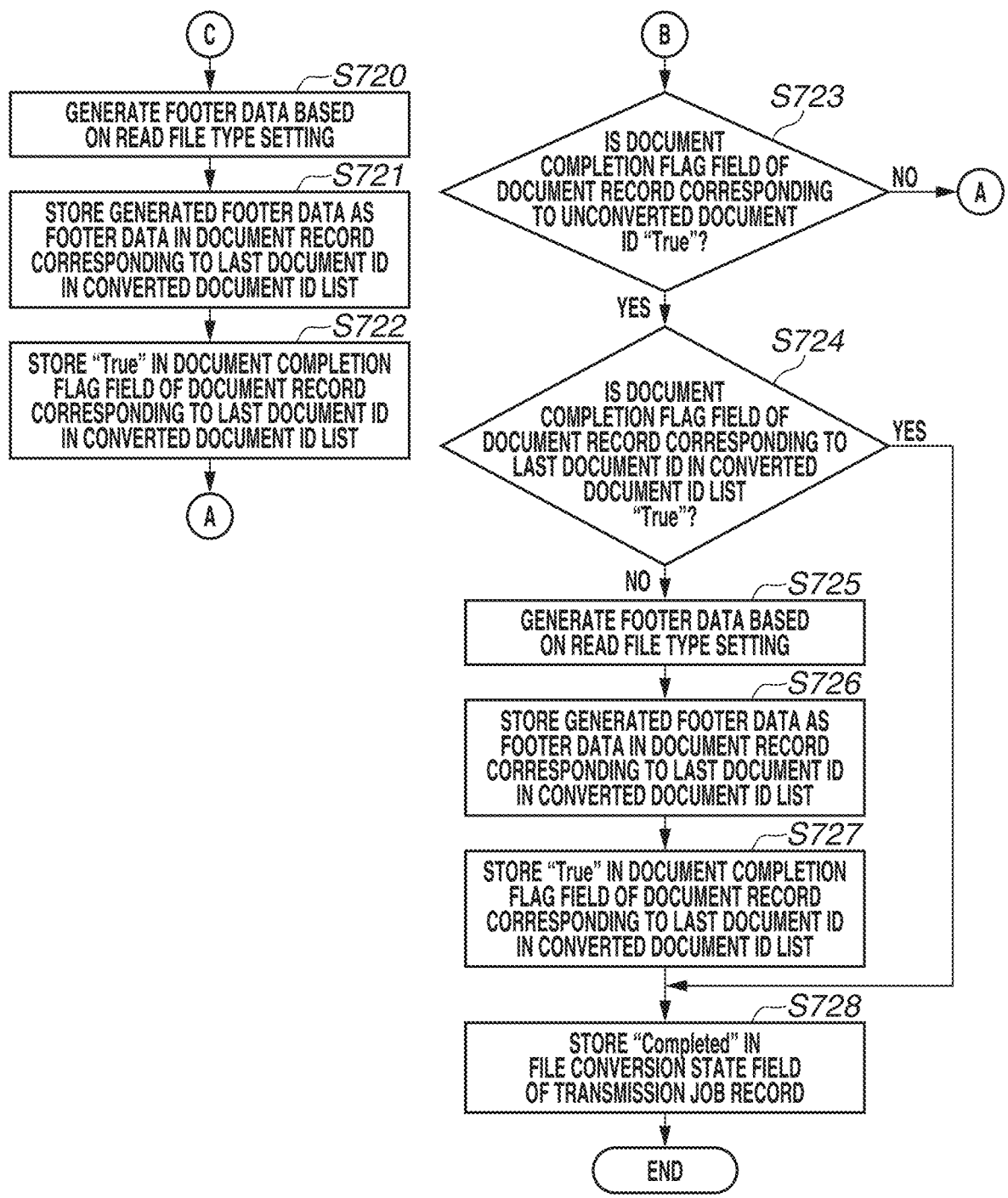

FIGS. 7A and 7B are a flowchart illustrating an example of the processing of the file conversion module 303. The processing of the present flowchart is implemented by the CPU 202 reading a program stored in the HDD 205 into the RAM 204 and executing the program.

The processing of the present flowchart is started when the file conversion module 303 is activated by the transmission job management module 301 in the processing of step S505. When the processing is started, in step S701, the file conversion module 303 initially receives the transmission job ID passed from the transmission job management module 301 upon activation, and identifies the transmission job record having the corresponding transmission job ID in the transmission job management table 305. By such processing, the file conversion module 303 can identify the transmission job record to be processed.

In step S702, the file conversion module 303 reads the file type and file division setting fields of the transmission job record identified in step S701 (hereinafter, referred to as "transmission job record"). Examples of the file type include the Portable Document Format (PDF) and Extensible Markup Language (XML) Paper Specification (XPS). File types with optional features, such as high compression PDF and optical character recognition (OCR)-PDF, are also included. The file division setting is a setting for dividing files in units of several pages. For example, if 10 pages of documents are scanned and the file division setting is to "divide files in units of three pages", three three-page files and one single-page file, i.e., a total of four files are generated.

In step S703, the file conversion module 303 stores "In process" in the file conversion state field of the transmission job record.

In step S704, the file conversion module 303 sets "1" to a variable X indicating the page number of an unconverted document to be converted.

In step S705, the file conversion module 303 reads the value of the unconverted document ID field of the transmission job record.

In step S706, the file conversion module 303 determines whether the job stop flag field of the transmission job record is "True". If the job stop flag field of the transmission job record is not "True" (NO in step S706), the processing proceeds to step S707.

In step S707, the file conversion module 303 searches the document management table 306 for a document record corresponding to the unconverted document ID read in step S705, and determines whether there is Xth page data in the searched document record. This determination corresponds to a determination whether there is page data stored by the scan module 302 in step S610 (FIG. 6A).

If there is Xth page data in the foregoing document record (YES in step S707), the processing proceeds to step S708.

In step S708, the file conversion module 303 determines whether the converted document ID list of the transmission job record is empty. This determination corresponds to a determination whether there still is no converted document related to the transmission job in process. The determination is "YES" only for the first round of the file conversion processing corresponding to the transmission job in process, and "NO" for the subsequent rounds.

If the converted document ID list of the transmission job record is empty (YES in step S708), the processing proceeds to step S709.

In step S709, the file conversion module 303 generates a new document record in the document management table 306. Here, the file conversion module 303 issues a unique document ID in the document management table 306, and stores the document ID in the new document record.

In step S710, the file conversion module 303 adds the document ID of the new document record generated in the foregoing step S709 to the converted document ID list field of the transmission job record.

In step S711, the file conversion module 303 generates header data of a document file based on the file type setting read in the foregoing step S702.

In step S712, the file conversion module 303 stores the header data generated in step S711 as header data in the document record corresponding to the last document 1D in the converted document ID list of the transmission job record. Here, the last document ID in the converted document ID list of the transmission job record coincides with the document ID added in step S710.

In step S713, the file conversion module 303 sets "1" to a variable Y indicating the page number of the document file being converted. The processing proceeds to step S715.

If, in step S708, the converted document ID list of the transmission job record is determined to be not empty (NO in step S708), the processing proceeds to step S714.

In step S714, the file conversion module 303 determines whether the document completion flag field of the document record corresponding to the last document ID in the converted document 1D list of the transmission job record is "True". This determination corresponds to a determination whether the corresponding document record is being generated.

If, in step S714, the document completion flag field of the document record corresponding to the last document ID in the converted document ID list of the transmission job record is not "True" (NO in step S714), the processing proceeds to step S715. This corresponds to the case where the document record is being generated.

In step S715, the file conversion module 303 applies conversion processing to the Xth page data in the document record corresponding to the unconverted document ID of the transmission job record based on the file type setting read in step S702.

In step S716, the file conversion module 303 stores the page data converted in step S715 as Yth page data in the document record corresponding to the last document ID in the converted document ID list of the transmission job record.

In step S717, the file conversion module 303 increments the variable X.

In step S718, the file conversion module 303 determines whether the file division setting read in the foregoing step S702 is to "divide files" and the remainder of the variable Y divided by the "number of pages for file division" is "0". For example, the determination is "NO" if the file division setting is to "divide files in units of three pages" and the number of pages of the document file currently being generated is two, and "YES" if the number of pages is three. If the file division setting is to not divide files, the determination is always "NO". This determination corresponds to a determination whether to perform footer generation processing on the document file.

If, in step S718, the file division setting is to "divide files" and the reminder of the variable Y divided by the "number of pages for file division" is not "0" or the file division setting is not to "divide files" (NO in step S718), the processing proceeds to step S719.

In step S719, the file conversion module 303 increments the variable Y. The processing returns to step S706. In step S706, the file conversion module 303 proceeds to the conversion processing of the next page.

On the other hand, if, in step S718, the file division setting is to "divide files" and the remainder of the variable Y divided by the "number of pages for file division" is "0" (YES in step S718), the processing proceeds to step S720.

In step S720, the file conversion module 303 generates footer data based on the file type setting read in step S702. Depending on the file type, the file conversion module 303 may generate the footer data by referring to the header data and page data in the document record corresponding to the last document ID in the converted document ID list of the transmission job record.

In step S721, the file conversion module 303 stores the footer data generated in step S720 as footer data in the document record corresponding to the last document ID in the converted document ID list of the transmission job record.

In step S722, after storing the footer data, the file conversion module 303 stores "True" in the document completion flag field of the document record corresponding to the last document ID in the converted document ID list of the transmission job record. The processing returns to step S706.

If, in step S714, the document completion flag field of the document record corresponding to the last document ID in the converted document ID list of the transmission job record is "True" (YES in step S714), the processing proceeds to step S709. In such a case, a new converted document record needs to be generated. The file conversion module 303 performs the foregoing steps S709 to S713, and then performs the processing of step S715 and the subsequent steps.

If, in step S707, it is determined that the document record corresponding to the unconverted document ID of the transmission job record does not include Xth page data (NO in step S707), the processing proceeds to step S723.

In step S723, the file conversion module 303 determines whether the document completion flag field of the document record corresponding to the unconverted document ID of the transmission job record is "True". There are two possible cases in which the file conversion module 303 determines in step S707 that there is no next image data to be converted. One is before the scan module 302 stores a new page. The other is where all the image data scanned by the scan module 302 has already been converted into a file or files. In step S723, such two cases are determined by using the document completion flag in the document record corresponding to the unconverted document ID.

If, in step S723, the document completion flag field of the document record corresponding to the unconverted document ID of the transmission job record is not "True" (NO in step S723), the processing returns to step S706. The reason is that next image data can still be generated by the scan module 302.

On the other hand, if the document completion flag field of the document record corresponding to the unconverted document ID of the transmission job record is "True" (YES in step S723), the processing proceeds to step S724. The reason is that in such a case, the scan module 302 has completed the document scan and all the image data in the document record corresponding to the unconverted document ID has been converted into a file or files.

In step S724, the file conversion module 303 determines whether the document completion flag field of the document record corresponding to the last document ID in the converted document ID list of the transmission job record is "True". In some cases, "True" is stored in the document completion flag field in step S722 when the processing reaches step S724. In such a case, the determination in step S724 is YES (YES in step S724), and the processing skips steps S725 to S727 to be described below and proceeds to step S728.

On the other hand, if the document completion flag field of the document record corresponding to the last document ID in the converted document ID list of the transmission job record is not "True" (NO in step S724), the processing proceeds to step S725.

In step S725, the file conversion module 303 generates footer data based on the file type setting read in the foregoing step S702.

In step S726, the file conversion module 303 stores the footer data generated in step S725 as footer data in the document record corresponding to the last document ID in the converted document ID list of the transmission job record.

In step S727, after storing the footer data, the file conversion module 303 stores "True" in the document completion flag field of the document record corresponding to the last document ID in the converted document ID list of the transmission job record. The processing proceeds to step S728.

In step S728, the file conversion module 303 stores "Completed" in the file conversion state field of the transmission job record. The processing of the present flowchart ends.

If, in step S706, the job stop flag field of the transmission job record is determined to be "True" (YES in step S706), the processing proceeds to step S729. The determination in step S706 is YES in the case where any one of the modules 302 to 304 has caused an error and the transmission job is not to be continued but to be aborted.

In step S729, the file conversion module 303 stores "Error termination" in the file conversion state field of the transmission job record. The processing of the present flowchart ends.

Figure 8A:
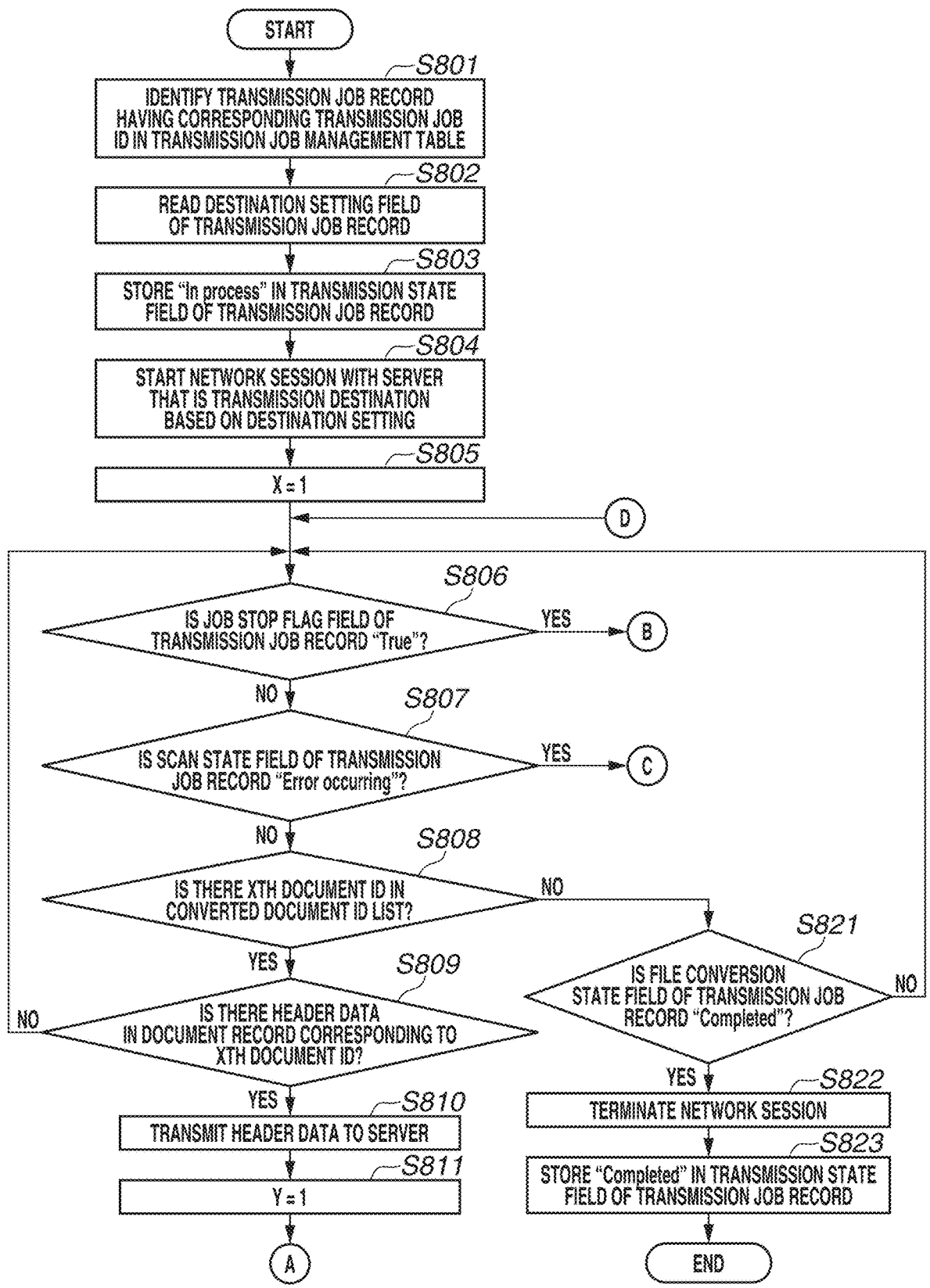

FIGS. 8A and 8B are a flowchart illustrating an example of overall processing of the transmission module 304. The processing of the present flowchart is implemented by the CPU 202 reading a program stored in the HDD 205 into the RAM 204 and executing the program.

The processing of the present flowchart is started when the transmission module 304 is activated by the transmission job management module 301 in the processing of step S506. When the processing is started, in step S801, the transmission module 304 initially receives the transmission job ID passed from the transmission job management module 301 upon activation, and identifies the transmission job record having the corresponding transmission job ID in the transmission job management table 305. By such processing, the transmission module 304 can identify the transmission job record to be processed.

In step S802, the transmission module 304 reads the destination setting field from the transmission job record identified in step S801 (hereinafter, referred to as "transmission job record").

In step S803, the transmission module 304 stores "In process" in the transmission state field of the transmission job record.

In step S804, the transmission module 304 starts a network session with the server 102 that is the transmission destination based on the destination setting read in S802. The network session here may be a Transmission Control Protocol/Internet Protocol (TCP/IP) session. For example, the networks session may cover up to establishing a control connection between the FTP client and the FTP server and further establishing a data connection. In other words, in the present exemplary embodiment, part or all of the handshaking before transmission of file data to the server 102 that is the transmission destination will be referred to as a network session. The communication protocol is not limited to the foregoing example.

In step S805, after starting a network session, the transmission module 304 sets "1" to a variable X indicating the number of a document file being transmitted.

In step S806, the transmission module 304 determines whether the job stop flag field of the transmission job record is "True". If the job stop flag field of the transmission job record is not "True" (NO in step S806), the processing proceeds to step S807.

In step S807, the transmission module 304 determines whether the scan state field of the transmission job record is "Error occurring". If the scan state field of the transmission job record is not "Error occurring" (NO in step S806), the processing proceeds to step S808.

In step S808, the transmission module 304 determines whether there is an Xth document ID in the converted document ID list of the transmission job record. If there is an Xth document ID in the converted document ID list of the transmission job record (YES in step S808), the processing proceeds to step S809.

In step S809, the transmission module 304 determines whether there is header data in the document record corresponding to the Xth document ID in the converted document ID list of the transmission job record. If there is no header data (NO in step S809), the processing returns to step S806.

On the other hand, if there is header data (YES in step S809), the processing proceeds to step S810.

In step S810, the transmission module 304 transmits the header data to the server 102 by using the network session started in the foregoing step S804.

In step S811, the transmission module 304 sets "1" to a variable Y indicating the number of page data being transmitted in the document file being transmitted.

In step S812, the transmission module 304 determines whether the job stop flag field of the transmission job record is "True". If the job stop flag field of the transmission job record is not "True" (NO in step S812), the processing proceeds to step S813.

In step S813, the transmission module 304 determines whether the scan state field of the transmission job record is "Error occurring". If the scan state field of the transmission job record is not "Error occurring" (NO in step S813), the processing proceeds to step S814.

In step S814, the transmission module 304 determines whether there is Yth page data in the document record corresponding to the Xth document ID in the converted document ID list of the transmission job record. If there is Yth page data in the corresponding document record (YES in step S814), the processing proceeds to step S815.

In step S815, the transmission module 304 transmits the Yth page data to the server 102 by using the started network session.

In step S816, after the transmission, the transmission module 304 increments the variable Y. The processing returns to step S812. In step S812, the transmission module 304 performs control to proceed to the transmission processing of next page data.

On the other hand, if, in step S814, it is determined that the document record corresponding to the Xth document ID in the converted document ID list of the transmission job record does not include Yth page data (NO in step S814), the processing proceeds to step S817.

In step S817, the transmission module 304 determines whether the document completion flag field of the document record corresponding to the Xth document ID in the converted document ID list of the transmission job record is "True". If the document completion flag field of the corresponding document record is not "True" (NO in step S817), the processing returns to step S812. The reason is that next page data can be added to the corresponding document record.

On the other hand, if, in step S817, the document completion flag field of the corresponding document record is determined to be "True" (YES in step S817), the processing proceeds to step S818. The reason is that the document completion flag indicates that the corresponding document record is completed and all the page data has been transmitted to the server 102. In step S818, the transmission module 304 determines whether there is footer data in the document record corresponding to the Xth document ID in the converted document ID list of the transmission job record.

If, in step S818, it is determined that the corresponding document record does not include footer data (NO in step S818), the processing returns to step S812. In step S812, the transmission module 304 performs control to wait for footer data to be generated.

On the other hand, if, in step S818, it is determined that the corresponding document record includes footer data (YES in step S818), the processing proceeds to step S819.

In step S819, the transmission module 304 transmits the footer data to the server 102 by using the started network session.

In step S820, the transmission module 304 increments the variable X. The processing returns to step S806. In step S806, the transmission module 304 performs control to proceed to the transmission processing of the next document file.

If, in step S808, it is determined that the document ID list does not include an Xth document ID (NO in step S808), the processing proceeds to step S821. In step S821, the transmission module 304 determines whether the file conversion state field of the transmission job record is "Completed".

If, in step S821, the file conversion state field of the transmission job record is determined to be not "Completed" (NO in step S821), the processing returns to step S806. The reason is that an Xth document ID can be added to the document ID list by the file conversion module 303.

On the other hand, if in step S821, the file conversion state field of the transmission job record is determined to be "Completed" (YES in step S821), the processing proceeds to step S822. The reason is that the file conversion state indicates that there is no possibility for an Xth document ID to be added to the document ID list and all the document files have been transmitted.

In step S822, the transmission module 304 terminates the started network session.

In step S823, the transmission module 304 stores "Completed" in the transmission state field of the transmission job record. The processing of the present flowchart ends.

If, in the foregoing step S806 or S812, the job stop flag field of the transmission job record is determined to be "True" (YES in step S806 or S812), the processing proceeds to step S825. In step S825, the transmission module 304 performs control to not continue but abort the transmission job.

In step S825, the transmission module 304 terminates the started network session. In step S825, the transmission module 304 performs control to delete the document file left transmitted halfway in the server 102, along with the termination of the network session. For example, if the FTP is used, the transmission module 304 performs such control by transmitting a DELE command (deletion instruction) to the server 102.

In step S826, the transmission module 804 stores "Error termination" in the transmission state field of the transmission job record. The processing of the present flowchart ends.

If, in the foregoing step S807 or S813, the scan state field of the transmission job record is determined to be "Error occurring" (YES in step S807 or S813), the processing proceeds to step S824. In step S824, the transmission module 304 performs transmission interruption processing. The processing returns to step S806.

Now, the transmission interruption processing (step S824) will be described in detail with reference to FIG. 9.

Figure 9:
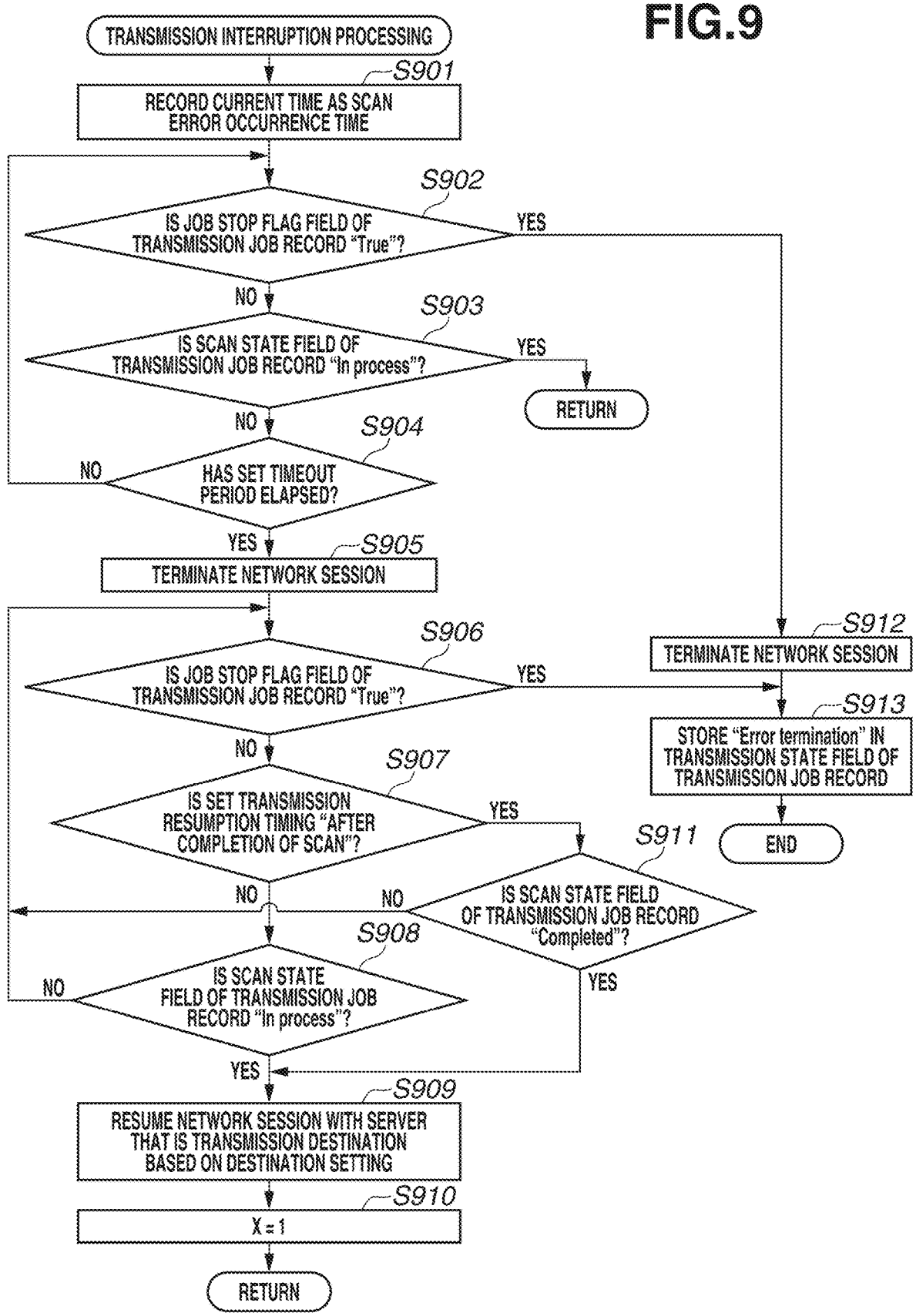
FIG. 9 is a flowchart illustrating details of transmission interruption processing according to a first exemplary embodiment.

FIG. 9 is a flowchart for describing details of the transmission interruption processing (step S824) according to a first exemplary embodiment. The processing of the present flowchart is implemented by the CPU 202 reading a program stored in the HDD 205 into the RAM 204 and executing the program.

In step S901, when the transmission interruption processing is started, the transmission module 304 records the current time as scan error occurrence time, for example, in the RAM 204.

In step S902, the transmission module 304 determines whether the job stop flag field of the transmission job record is "True". If the job stop flag field of the transmission job record is not "True" (NO in step S902), the processing proceeds to step S903.

In step S903, the transmission module 304 determines whether the scan state field of the transmission job record is "In process". This determination is intended to determine whether a scan error has been resolved and the scan state has returned to "In process" within a certain time after the occurrence of the scan error.

If, in step S903, the scan state field of the transmission job record is determined to be not "In process" (NO in step S903), the processing proceeds to step S904.

In step S904, the transmission module 304 compares the current time with the scan error occurrence time recorded in step S901, and determines whether a set timeout period has elapsed. For the timeout period here, a specific time may be preset in the MFP 101, for example.

If, in step S904, it is determined that the timeout period has not elapsed (NO in step S904), the processing returns to step S902.

If, in step S903, the scan state field of the transmission job record is determined to be "In process" (YES in step S903), the processing exits the transmission interruption processing and returns to step S806 (FIG. 8A). This corresponds to a case where the scan error is resolved before the lapse of the timeout period.

If, in step S904, it is determined that the timeout period has elapsed (YES in step S904), the processing proceeds to step S905.

In step S905, the transmission module 304 once terminates the started network session. The transmission module 304 performs control to delete the document file left transmitted halfway in the server 102, along with the termination of the network session. In step S905, the transmission module 304 further performs control to display a message indicating that the document file is being deleted from the server 102 on the operation panel 210 for user notification.

In step S906, after the termination of the network session, the transmission module 304 determines whether the job stop flag field of the transmission job record is "True". If the job stop flag field of the transmission job record is not "True" (NO in step S906), the processing proceeds to step S907.

In step S907, the transmission module 304 determines whether a set transmission resumption timing is "after completion of a scan" or "after error recovery". The transmission resumption timing may be preset in the MFP 101, for example. The setting of the transmission resumption timing may be included in the settings made in step S501 of FIG. 5.

If, in step S907, the set transmission resumption timing is determined to be "after error recovery" (NO in step S907), the processing proceeds to step S908.

In step S908, the transmission module 304 determines whether the scan state field of the transmission job record is "In process". If the scan state field of the transmission job record is not "In process" (NO in step S908), the processing returns to step S906. In step S906, the transmission module 304 performs control to wait for the scan error to be resolved.

On the other hand, if the scan state field of the transmission job record is "In process" (YES in step S908), the processing proceeds to step S909.

If, in step S907, the set transmission resumption timing is determined to be "after completion of a scan" (YES in step S907), the processing proceeds to step S911.

In step S911, the transmission module 304 determines whether the scan state field of the transmission job record is "Completed". If the scan state field of the transmission job record is determined to be not "Completed" (NO in step S911), the processing returns to step S906. In step S906, the transmission module 304 performs control to wait for the scan error to be resolved.

On the other hand, if, in step S911, the scan state field of the transmission job record is determined to be "Completed" (YES in step S911), the processing proceeds to step S909.

In step S909, i.e., if the determination in step S908 or S911 is YES, the transmission module 304 starts (resumes) the network session with the server 102 that is the transmission destination based on the destination setting read in the foregoing step S802.

In step S910, the transmission module sets "1" to the variable X again. The processing exits the transmission interruption processing and returns to step S806 (FIG. 8A).

If the determination in the foregoing step S902 or S906 is YES (the job stop flag field is "True"), the entire processing of the transmission module 304 ends without exiting the transmission interruption processing. A detailed description thereof is given below.

If, in step S902, the job stop flag field of the transmission job record is determined to be "True" (YES in step S902), the processing proceeds to step S912.

In step S912, the transmission module 304 terminates the started network session. The processing proceeds to step S913. In step S912, the MFP 101 performs control to delete the document file left transmitted halfway in the server 102, along with the termination of the network session.

If, in step S906, the job stop flag field of the transmission job record is determined to be "True" (YES in step S906), the processing proceeds to step S913.

In step S913, the transmission module 304 stores "Error termination" in the transmission state field of the transmission job record. The processing of the present flowchart and the flowchart of FIGS. 8A and 8B ends.

As described above, according to the first exemplary embodiment, when the occurrence of a scan error in the scan module 302 is detected, the transmission module 304 performs processing for releasing the network session through the transmission interruption processing described with reference to FIG. 9. This prevents the MFP 101 from occupying network resources of the server 102 if the user's operation for resolving the scan error takes time. In addition, after the scan error is resolved, the transmission processing can be resumed without troubling the user.

Now, a second exemplary embodiment will be described. A description of similar configurations to those of the foregoing first exemplary embodiment will be omitted. Different configurations will be mainly described.

Figure 10:
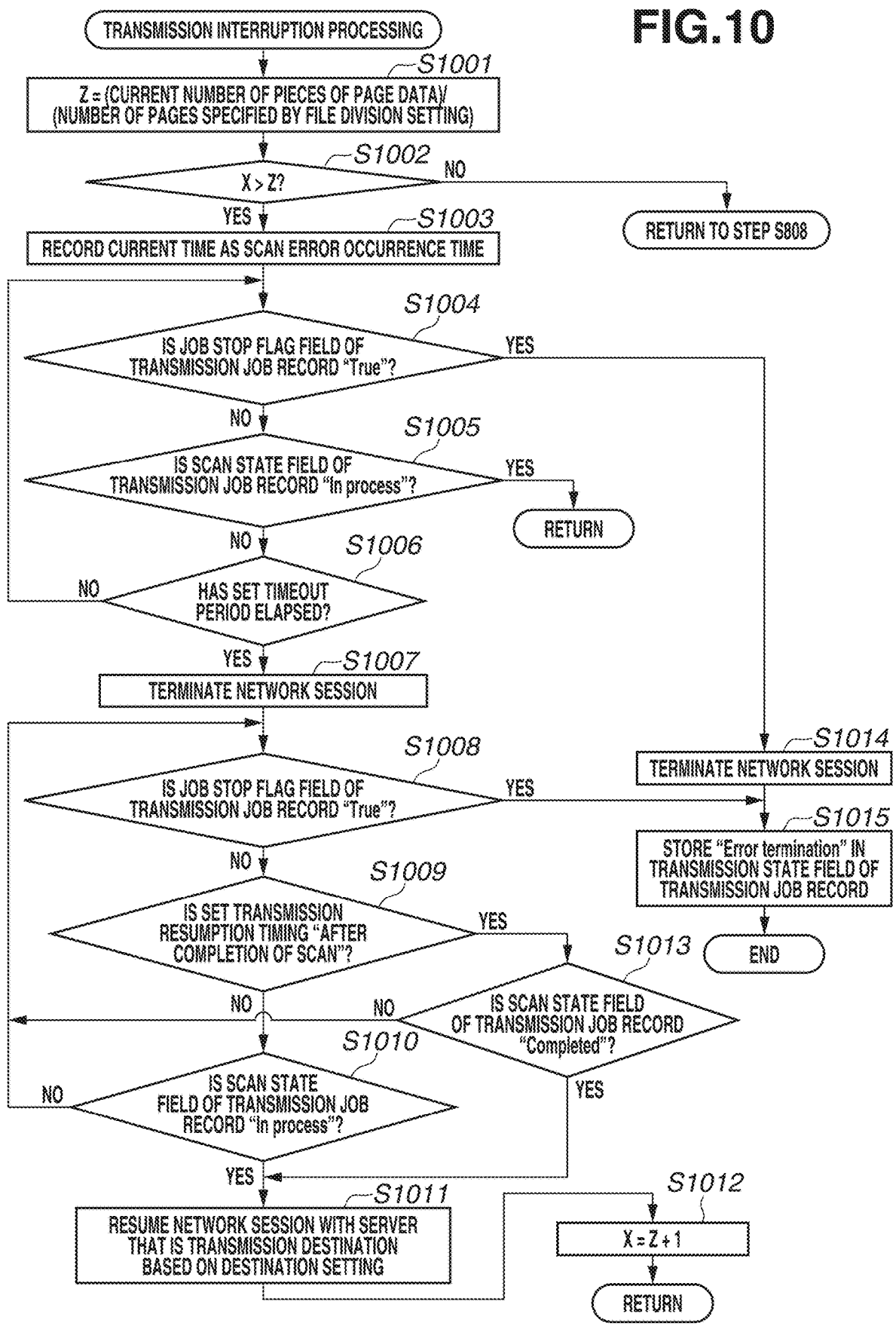
FIG. 10 is a flowchart illustrating details of transmission interruption processing according to a second exemplary embodiment.

FIG. 10 is a flowchart for describing details of the transmission interruption processing (step S824) according to the second exemplary embodiment. The processing of the present flowchart is implemented by the CPU 202 reading a program stored in the HDD 205 into the RAM 204 and executing the program.

In step S1001, when the transmission interruption processing starts, the transmission module 304 sets a variable Z at the number of document files that can be generated from the number of pieces of image data having been scanned before the occurrence of the scan error. Specifically, this processing can be implemented by storing a numerical value obtained by dividing the number of pieces of page data in the document record corresponding to the unconverted document ID of the transmission job record by the number of pages specified by the file division setting in the transmission job record into the variable Z. The variable Z is an integer value, calculated by rounding down decimals. If the file division setting is to not divide files, "0" is set to the variable Z. For example, if a scan error occurs at the ninth page of the documents and the file division setting is to divide files in units of three pages, the variable Z has a value resulting from "8÷3", i.e., "2", which indicates that two document files can be generated from the page data up to the eighth page. For example, if a scan error occurs at the ninth page of the documents and the file division setting is to not divide files, the variable Z is "0", which indicates that no document file can be generated from the page data up to the eighth page.

In step S1002, the transmission module 304 determines whether the variable X indicating the number of the document file currently being transmitted is greater than the variable Z. That the variable X is greater than the variable Z means that a document file that will not be completed until the scan error is resolved is being transmitted.

The variable X being less than or equal to the variable Z, on the other hand, means that a document file that is completed without resolving the scan error is being transmitted.

If, in step S1002, the variable X is determined to be less than or equal to the variable Z (NO in step S1002), the processing returns to step S808 (FIG. 8A). The transmission processing is thereby continued, and the document file that is completed without resolving the scan error is transmitted to the server 102.

On the other hand, if, in step S1002, the variable X is determined to be greater than the variable Z (YES in step S1002), the processing proceeds to step S1003. The processing of steps S1003 to S1011, S1014, and S1015 is similar to that of steps S901 to S909, S911, and S912 in FIG. 9. A description thereof will thus be omitted.

In step S1012, the transmission module 304 stores the value of the variable Z+1 into the variable X. The processing exits the transmission interruption processing and returns to step S806 (FIG. 8A).

In the processing of step S1012, the transmission module 304 determines which document file to retransmit upon resuming transmission. By setting the variable X at the variable Z+1, transmission can be resumed at the transmission-interrupted document file. In other words, if the error of the scanner 211 is resolved, the transmission module 304 according to the present exemplary embodiment resumes the network session and transmits the transmission-unfinished page data among the pieces of data on which the conversion processing is performed to the server 102.

As described above, according to the second exemplary embodiment, even when the occurrence of a scan error in the scan module 302 is detected, the transmission module 304 performs processing for transmitting as many document files as possible through the transmission interruption processing described with reference to FIG. 10. If the processing has proceeded up to the transmission of a document file that will not be completed without resolving the scan error, the transmission module 304 performs processing for releasing the network session. This can prevent the MFP 101 from occupying network resources of the server 102 if the user's operation for resolving the scan error takes time. In addition, after the scan error is resolved, the transmission processing can be resumed without troubling the user. The document file to be transmitted after resumption is suppressed to the minimum, and the time to the end of the transmission job can be reduced.

As described above, according to the exemplary embodiments, if image data obtained by reading part of documents to be read by the scanner 211 is transmitted while the scanner 211 is still reading the rest of the documents, and there occurs a scanner error, transmission processing can be performed with suppressed load on the apparatus that is the transmission destination of the image data.

Conventionally, the communication session with the transmission destination server has been left connected in a case where a scanner error occurs while scanning and transmission processing are performed in parallel. This has ended up with the MFP occupying network resources of the server during the user's error resolving operation. There has thus been an issue of increased load on the server.

Transmission processing with reduced load on the server during the user's error resolving operation can be performed by disconnecting the connection with the server if a scanner error occurs while scanning and transmission processing are performed in parallel.

The configurations and contents of various types of data are not limited to the foregoing. Various configurations and contents may be employed depending on the intended uses and purposes.

While several exemplary embodiments have been described above, exemplary embodiments of the present disclosure may include, for example, a system, an apparatus, a method, a program, and/or a recording medium. Specifically, an exemplary embodiment of the present disclosure may be applied to a system including a plurality of devices. An exemplary embodiment may be applied to an apparatus including a single device.

All combinations of the foregoing exemplary embodiments may also be included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-217458, filed Nov. 20, 2018, and No. 2018-222415, filed Nov. 28, 2018, which are hereby incorporated by reference herein in their entirety.

What is claimed is:

1. A transmission apparatus comprising:
a scanner;
one or more processors; and
memory storing instructions that, when executed by the one or more processors, cause the transmission apparatus to perform operations including:
setting a predetermined time,
performing a first control about reading a plurality of pages of a plurality of documents by using the scanner to generate image data,
performing a second control about conversion processing of the generated image data, and
performing a third control about transmission, to an external apparatus via a network, of processed data on which the conversion processing is performed,
wherein the third control includes starting a session while a document from the plurality of documents is being read based on the first control, and transmitting, to the external apparatus via the network, the processed data on which conversion processing is already performed,
wherein, in a case where an error occurs in the scanner in reading the document, the third control includes disconnecting the started session after a lapse of the predetermined time from an error occurrence time of the occurred error, and
wherein, in a case where the error in the scanner is resolved after the lapse of the predetermined time from the error occurrence time, the third control includes reconnecting the disconnected session and transmitting, to the external apparatus via the network, processed data on which the conversion processing is performed, and
wherein, in a case where the error in the scanner is resolved before the lapse of the predetermined time from the error occurrence time, the third control includes maintaining the session with the external apparatus without disconnecting the session and includes restarting a transmission of the processed data using the maintained session.

2. The transmission apparatus according to claim 1, wherein, in the case where the error is resolved after the lapse of the predetermined time from the error occurrence time, the third control includes reconnecting the disconnected session after reading of all remaining pages of the plurality of pages is completed by the scanner, and transmitting, to the external apparatus via the network, the processed data on which the conversion processing is performed.

3. The transmission apparatus according to claim 1, wherein, in a case where a division setting to divide and generate files in units of a predetermined number of pages is enabled among settings of the conversion processing and the session is disconnected in response to occurrence of the error in the scanner in reading the document, the third control includes issuing, to the external apparatus, an instruction to delete processed data transmitted to the external apparatus from the transmission apparatus.

4. The transmission apparatus according to claim 3, wherein, in a case where (i) the division setting is enabled, (ii) the session is disconnected in response to the occurrence of the error in the scanner, and (iii) then the error in the scanner is resolved after the lapse of the predetermined time from the error occurrence time, the third control includes reconnecting the disconnected session and transmitting, to the external apparatus via the network, all the processed data on which the conversion processing is performed.

5. The transmission apparatus according to claim 1, wherein, in a case where a division setting to divide and generate files in units of a predetermined number of pages is enabled among settings of the conversion processing and the error occurs in the scanner, the third control includes performing the transmission to the external apparatus via the network up to processed data obtained by performing the conversion processing on a page prior to one at which the error occurs, and then disconnecting the session.

6. A method for a transmission apparatus having a scanner, the method comprising:

setting a predetermined time;
performing a first control about reading a plurality of pages of a plurality of documents by using the scanner to generate image data;
performing a second control about conversion processing of the generated image data; and
performing a third control about transmission, to an external apparatus via a network, of processed data on which the conversion processing is performed,
wherein the third control includes starting a session while a document from the plurality of documents is being read based on the first control, and transmitting, to the external apparatus via the network, the processed data on which conversion processing is already performed,
wherein, in a case where an error occurs in the scanner in reading the document, the third control includes disconnecting the started session after a lapse of the predetermined time from an error occurrence time of the occurred error, and
wherein, in a case where the error in the scanner is resolved after the lapse of the predetermined time from the error occurrence time, the third control includes reconnecting the disconnected session and transmitting, to the external apparatus via the network, processed data on which the conversion processing is performed, and
wherein, in a case where the error in the scanner is resolved before the lapse of the predetermined time from the error occurrence time, the third control includes maintaining the session with the external apparatus without disconnecting the session and includes restarting a transmission of the processed data using the maintained session.

7. A non-transitory computer-readable storage medium storing a program to cause a computer to perform a method for a transmission apparatus having a scanner, the method comprising:

setting a predetermined time;
performing a first control about reading a plurality of pages of a plurality of documents by using the scanner to generate image data;
performing a second control about conversion processing of the generated image data; and
performing a third control about transmission, to an external apparatus via a network, of processed data on which the conversion processing is performed,
wherein the third control includes starting a session while a document from the plurality of documents is being read based on the first control, and transmitting, to the external apparatus via the network, the processed data on which conversion processing is already performed,
wherein, in a case where an error occurs in the scanner in reading the document, the third control includes disconnecting the started session after a lapse of the predetermined time from an error occurrence time of the occurred error, and
wherein, in a case where the error in the scanner is resolved after the lapse of the predetermined time from the error occurrence time, the third control includes reconnecting the disconnected session and transmitting, to the external apparatus via the network, processed data on which the conversion processing is performed, and
wherein, in a case where the error in the scanner is resolved before the lapse of the predetermined time from the error occurrence time, the third control includes maintaining the session with the external apparatus without disconnecting the session and includes restarting a transmission of the processed data using the maintained session.

* * * * *